United States Patent
Bunker et al.

(10) Patent No.: US 6,504,274 B2
(45) Date of Patent: Jan. 7, 2003

(54) GENERATOR STATOR COOLING DESIGN WITH CONCAVITY SURFACES

(75) Inventors: Ronald Scott Bunker, Niskayuna, NY (US); Todd Garrett Wetzel, Niskayuna, NY (US); Emil Donald Jarczynski, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/754,701

(22) Filed: Jan. 4, 2001

(65) Prior Publication Data

US 2002/0084703 A1 Jul. 4, 2002

(51) Int. Cl.[7] .................................................. H02K 9/00
(52) U.S. Cl. .......................................... 310/64; 310/52
(58) Field of Search ........................ 318/42, 48; 310/52, 310/216, 54

(56) References Cited

U.S. PATENT DOCUMENTS

| | | | | |
|---|---|---|---|---|
| 4,364,169 A | * | 12/1982 | Kawano et al. | 29/596 |
| 4,538,345 A | * | 9/1985 | Diederichs | 29/596 |
| 5,075,150 A | * | 12/1991 | Webb et al. | 428/162 |
| 5,338,996 A | * | 8/1994 | Yamamoto | 310/217 |
| 5,349,741 A | * | 9/1994 | Neuenschwander | 29/598 |
| 5,826,323 A | * | 10/1998 | Walters | 29/593 |
| 5,992,003 A | * | 11/1999 | Elliott et al. | 29/596 |
| 6,064,134 A | * | 5/2000 | El-Antably et al. | 310/261 |

OTHER PUBLICATIONS

Belen'kii et al., "Experimental Study of the Thermal and Hydraulic Characteristics of Heat–Transfer Surfaces Formed by Spherical Cavitives" Teplofizika Vysokikh Temperatur, vol. 29, No. 6, pp. 1142–1147, Nov.–Dec., 1991.
Afanas'yev et al., "Thermohydraulics of Flow Over Isolated Depressions (Pits, Grooves) in a Smooth Wall" Heat Transfer Research, vol. 25, No. 1, 1993, pp. 22–56.
Belen'kiy et al. "Heat Transfer Augmentation Using Surfaces Formed by a System of Spherical Cavities", Heat Transfer Research, vol. 25, No. 2, 1993, pp. 196–203.
Kesarev et al., "Convective Heat Transfer in Turbulized Flow Past a Hemispherical Cavity", Heat Transfer Research, vol. 25, No. 2, 1993 pp. 156–160.
Afanasyev et al., "Turbulent Flow Friction and Heat Transfer Characteristics for Spherical Cavities on a Flat Plate," Experimental Thermal and Fluid Science 1993: vol. 7 pp. 1–8.
Chyu et al., "Concavity Enhanced Heat Transfer in an Internal Cooling Passage," paper No. 97–GT–437 presented at the International Gas Turbine & Aeroengine Congress & Exhibition, Orlando, Florida, Jun. 2–Jun. 5, 1997, pp. 1–7.
Syred et al., "Effect of Surface Curvature on Heat Transfer and Hydrodynamics with a Single Hemispherical Dimple," paper No. 2000–GT–236, Proceedings of ASME Turboexpo 2000, May 8–11, 2000, Munich Germany, pp. 1–6.

* cited by examiner

Primary Examiner—Nestor Ramirez
Assistant Examiner—Karen Beth Addison
(74) Attorney, Agent, or Firm—Banner & Witcoff, Ltd.

(57) ABSTRACT

A stator core assembly comprising adjacent packages of stacked lamination sheets that are separated by a plurality of radially extending spacer blocks, and each adjacent pair of spacer blocks define in cooperation with adjacent axially spaced laminations, a plurality of radial cooling ducts, each duct having a least one lamination surface having plurality of concavities.

33 Claims, 9 Drawing Sheets

GENERATOR STATOR COOLING DESIGN WITH CONCAVITY SURFACES

BACKGROUND OF THE INVENTION

In the art of electrical generator design, it is understood that magnetic and resistive losses within a stator generate heat that must be dissipated and removed to avoid electromechanical failure, and that these losses pose a serious constraint on the capacity of a machine of given physical dimension.

Conventional generator systems are typically cooled by air or hydrogen, both in the form of a forced convective flow within channels and turning regions. An industry requirement for the stator bars within the generator core is that the central region temperature between conducting bars not exceed a preset limit. Many factors influence the maximum central region temperature experienced in operation, including the stator bar design and insulation, the magnetic flux field, the core design, and the cooling design.

In order to reach high power density in generators, the stator core requires a certain level of cooling through stacks of lamination sheets. In conventional generators, spacer ribs or blocks are used between lamination sheets to leave room for coolant gas flow cooling ducts. Coolant gas, such as air, is forced through these cooling ducts at various intervals through the stator core by a fan. More specifically, coolant gas is conveyed from the radially outward portions of the stator core to the inward portions of the core (or vice-a-versa), thereby flowing through the core and past the stator bars. The coolant gas picks up and carries heat away from the stator core and its corresponding rotor. The heated gas may they be sent through a heat exchanger(s), where the heat is transferred to another coolant, such as water. The now cooled gas can then be recirculated to the cooling ducts, in a repeated and continuous process.

In conventional generators, the cooling ducts in the stator have either smooth walled channels, or channels with turbulators. See for example, U.S. Pat. No. 5,869,912. In U.S. Pat. No. 5,869,912, adjacent packages of stacked laminations are separated by a plurality of radially extending spacer ribs or blocks, and wherein each adjacent pair of spacer blocks define in cooperation with adjacent axially spaced laminations, a cooling duct, and a plurality of turbulator elements in each cooling duct, each turbulator element extending into the duct from one of the adjacent axially spaced laminations. The purpose of the turbulation elements is to increase the hear transfer performance, than for smooth walled channels.

While the heat transfer performance is improved with turbulation elements, a coolant pressure penalty is associated with higher friction or bluff body losses in the stator cooling ducts, such that the overall generator efficiency can be adversely impacted if the pressure drop increases as the cooling efficiency increases. In other words, turbulation elements can give rise to more friction, which in turn requires more energy to push coolant gas through the system, thereby reducing the efficiency of the generator.

It is therefore desirable to obtain a stator duct cooling system design that increases cooling efficiency, while minimizing or eliminating friction penalty losses in conventional generators. It is further desirable to increase the overall power efficiency, while maintaining the same basic stator core size.

BRIEF SUMMARY OF THE INVENTION

The present invention is stator core assembly comprising adjacent packages of stacked lamination sheets that are separated by a plurality of radially extending spacer blocks, and each adjacent pair of spacer blocks define in cooperation with adjacent axially spaced laminintions, a plurality of radial cooling ducts, each duct having a least one lamination surface having plurality of concavities.

The concavities extend away from the stator core cooling ducts. The concavities enhance the degree of heat transfer between heated gas adjacent to the duct wall and relatively cooler gas near the duct centerline. This enhanced level of mixing brings cooler gas in contact with the duct wall, allowing greater heat transfer. Further, the concavities increase the surface area exposed to the coolant gas. Another feature is that at each concavity, a vortex of organized flow is created and expelled therefrom so to permit cooler gas to enter the concavity. The end result is that more cooling is achieved with the present invention because of (1) increased mixing between cooler gas and heated gas, (2) more surface area for contact between coolant gas and ducts, and (3) vortices that permit cooler gas to enter the concavity and then take away heat from the ducts.

Moreover, the design in accordance with the present invention achieves enhanced cooling, while minimizing friction losses. Thus, the present invention solves a key disadvantage of friction losses associated with designs that use turbulation elements. The present invention provides the same or similar benefits and applications as do designs having turbulation elements (see U.S. Pat. No. 5,869,912), but achieves a higher overall efficiency because it avoids or minimizes the friction losses associated with designs having turbulation elements.

The present invention can be readily incorporated into new machines or retrofitted into existing machines. The present invention can be incorporated into a broad range of generator cooling designs, as it can be applied in conjunction with any gaseous or liquid cooling medium presently in use or reasonably anticipated for future application by those skilled in the art.

DETAILED DESCRIPTION OF THE INVENTION

Figure 1:
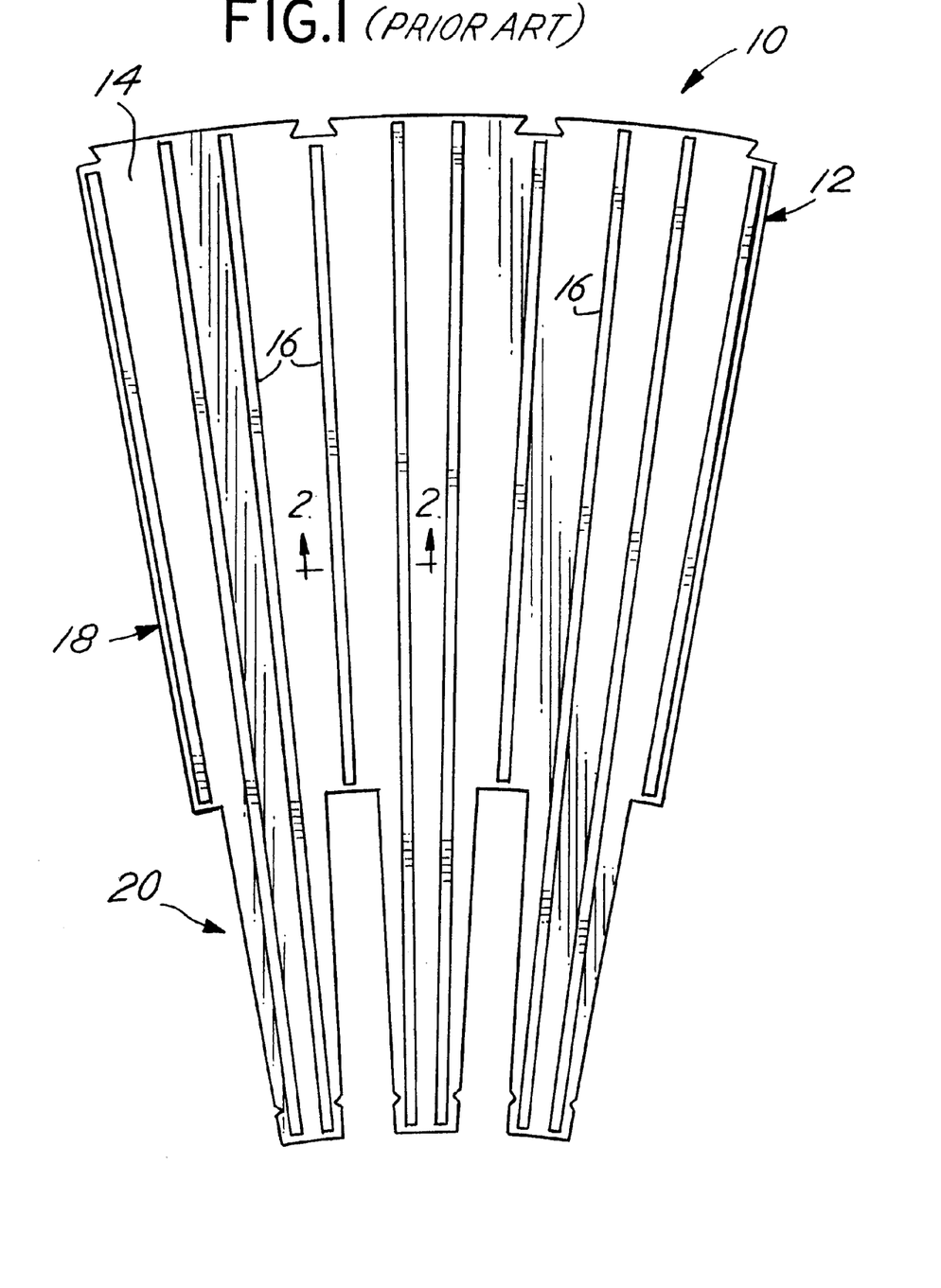
FIG. 1 is a partial side elevation of a conventional stator core lamination assembly having smooth walled cooling ducts.
Figure 2:
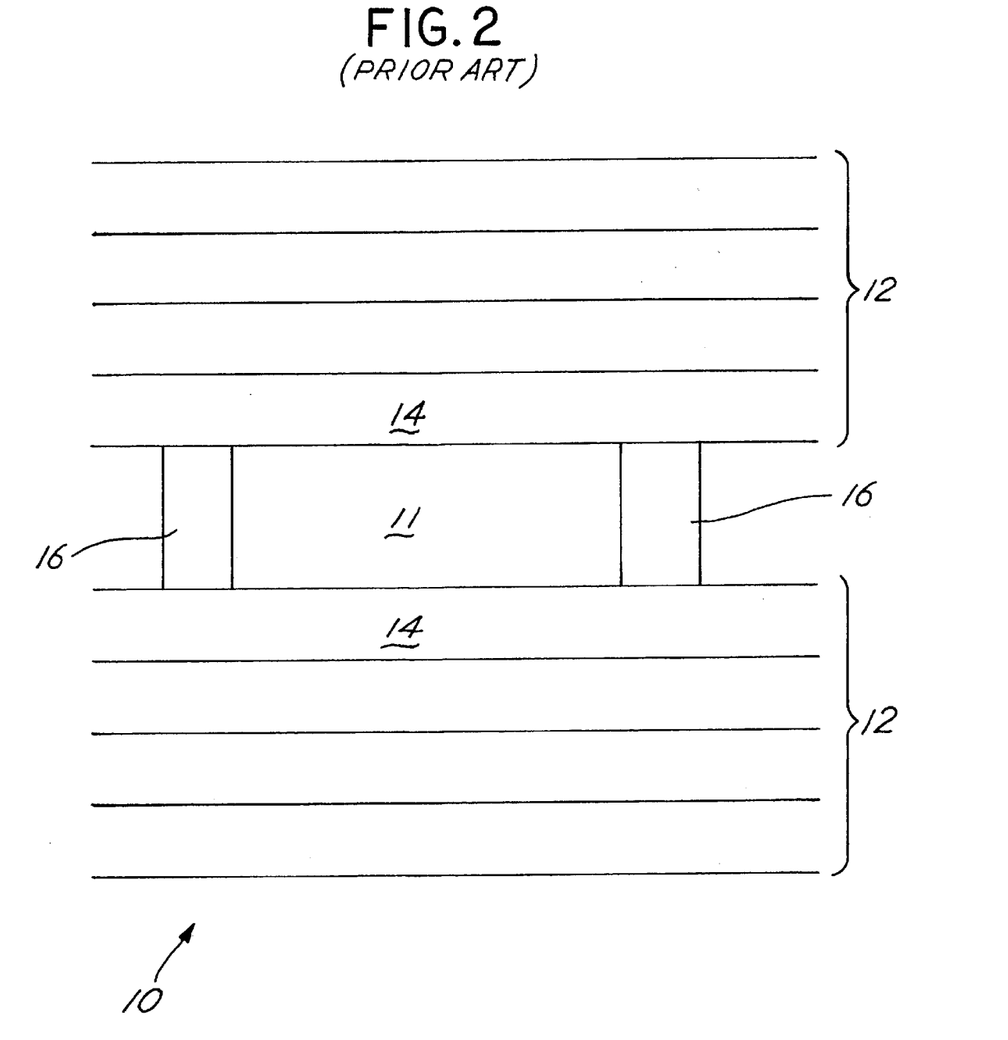
FIG. 2 illustrates a partial end view taken along line 2—2 of a conventional stator core lamination assembly shown in FIG. 1.

As noted above, U.S. Pat. No. 5,869,912 describes stator core lamination assemblies that have smooth walled cooling ducts or cooling ducts having turbulation elements. In FIGS. 1 and 2, a portion of a conventional stator core lamination assembly 10 having smooth walled cooling ducts 11 is shown. The assembly may comprise approximately 70 discrete laminations within a "package" 12. Except as noted below, these lamination packages are approximately 1 to 3 inches thick. A plurality of inside spacer blocks or rods 16 are secured to the "outermost" lamination 14 of the package, and extend radially along the yoke portion or region 18 of the core lamination, and longer spacer blocks or rods which extend radially not only along the yoke region 18, but also long the radially inner tooth region 20. The lamination to which the inside spacer blocks are welded is thicker than the remaining laminations in the package, typically 0.025 inch thick. The inside spacer blocks 16 have a generally rectangular or square shape with a pair of flat sides engaging adjacent stator core lamination packages 12 to thereby define a plurality of radially extending coolant passages or ducts between adjacent spacer blocks. The inside spacer blocks 16 can have various other cross sections, e.g., an I-beam cross-section. Depending on the particular cooling arrangement, coolant flow may be in a radially inward or radially outward direction. Typically, the inside spacer blocks have a height of about 0.250 inches, which also then defines the height of the coolant passage. The width of the spacer blocks is also about 0.250 inches. FIG. 2 is a partial end view of the conventional stator core lamination assembly 10 having smooth walled cooling ducts 11 (only one duct 11 is shown).

Figure 3:
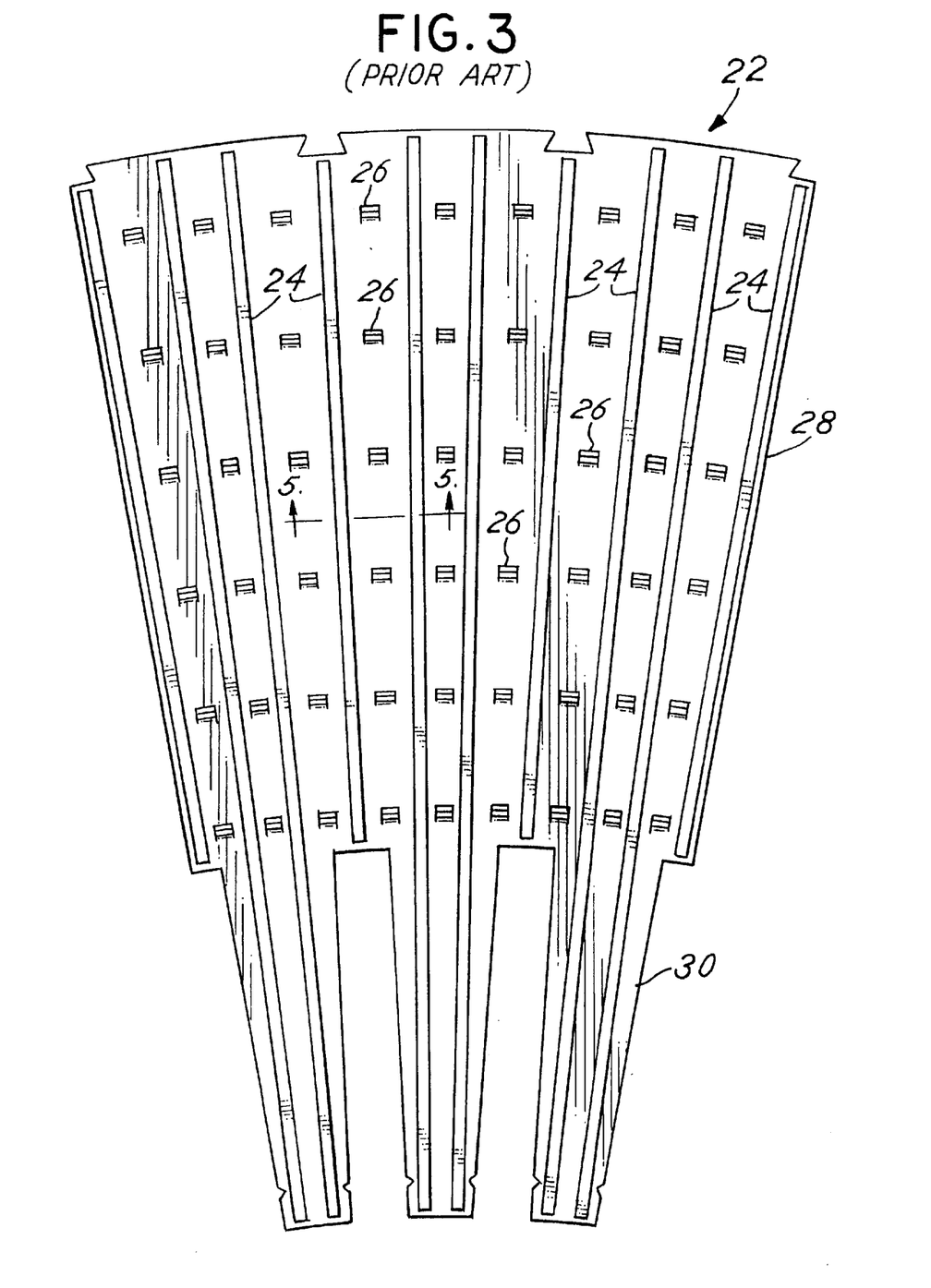
FIG. 3 is a partial side elevation view of a conventional stator core lamination assembly having turbulation elements.
Figure 4:
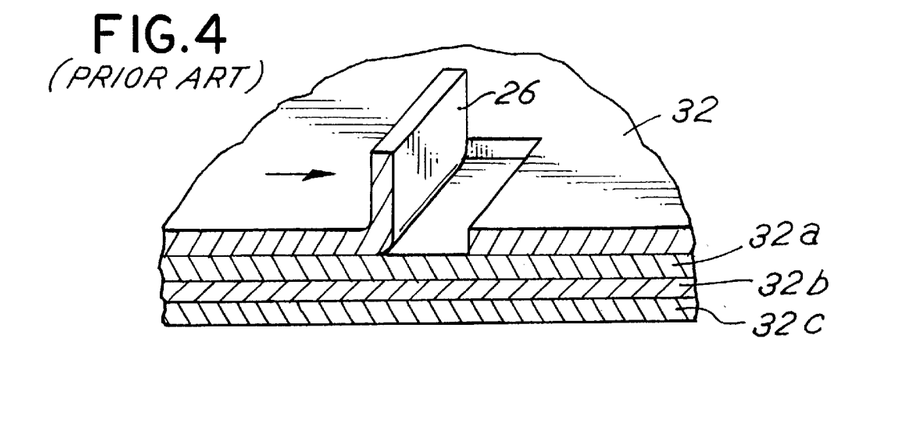
FIG. 4 is an enlarged partial perspective view of a turbulator shown in FIG. 3.
Figure 5:
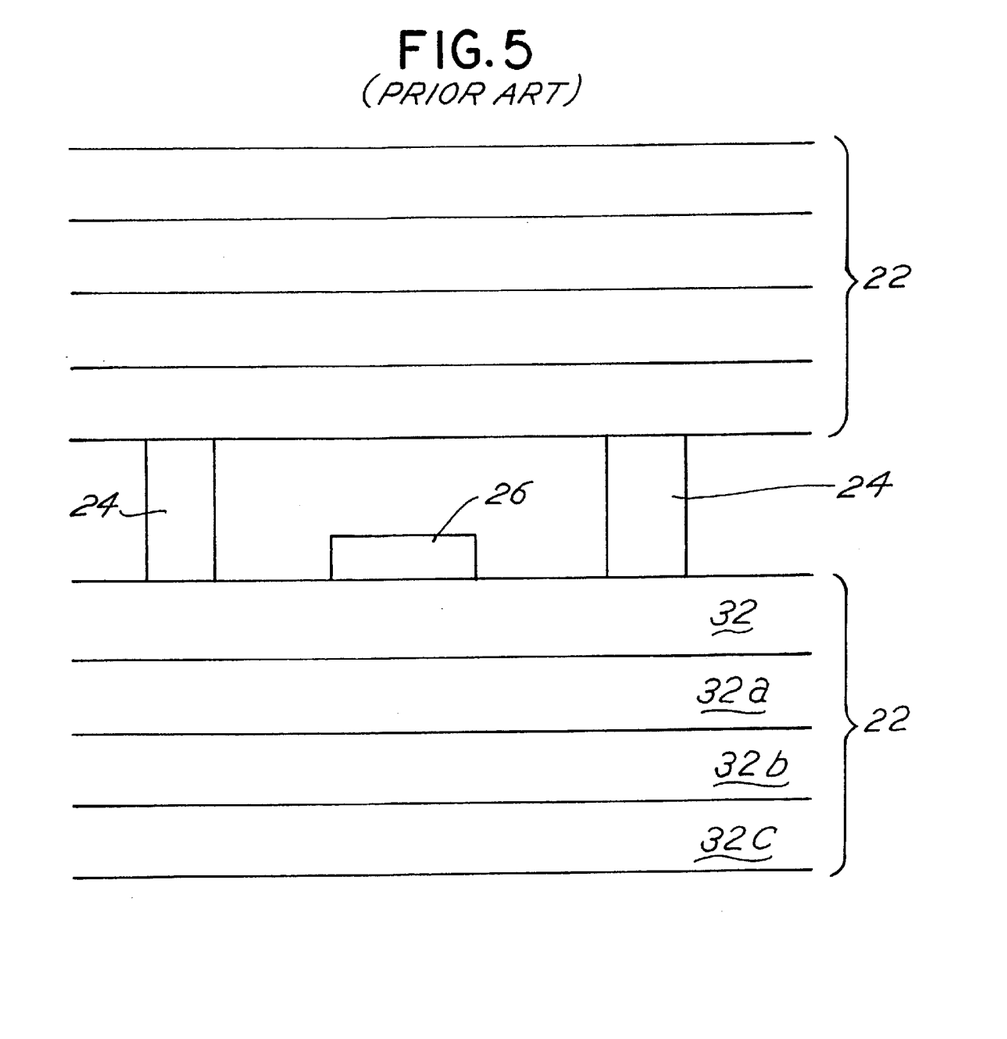
FIG. 5 illustrates a partial end view taken along line 5—5 of a conventional stator core lamination assembly shown in FIG. 3.

In FIGS. 3, 4 and 5, partial views of a conventional stator core lamination assembly having turbulation elements is shown. The stator core lamination package 22 is generally similar to that shown in FIG. 1, in that radially oriented coolant passages are formed by radially extending spacer blocks 24 and two adjacent laminations of adjacent lamination packages. FIG. 3 also illustrates the location and orientation of a plurality of turbulators 26 within each of the radially extending cooling ducts. As described in U.S. Pat. No. 5,869;912, turbulators 26 are located at regularly spaced intervals in the radial direction, and follow generally the curvature of the stator core assembly in a circumferential direction. FIG. 4 is an enlarged partial perspective view of a turbulator shown in FIG. 3. As described in U.S. Pat. No. 5,869,912, turbulators 26 are formed in only the single lamination 32 of the many laminations 32, 32a, 32b, 32c, . . . in the package which forms one wall of the cooling duct. In this embodiment, the turbulator 26 may have a width of 0.380 inch and is oriented 90 degrees relative to the plane of the lamination assembly. However, the turbulators may be formed at an angle of between, for example, 30 or 45 degrees relative to the plane of the lamination as described in U.S. Pat. No. 5,869,912. These turbulators are formed by ribs or tabs which are punched out of the lamination and then bent so as to extend into the coolant passage. This is done prior to assembly of the respective package. The lamination in which the turbulators are formed has a thickness of about 0.025 inch, which the other laminations 32a, b, c, etc., in the package have a wall thickness of about 0.014 inch. The ratio between the radial spacing of the turbulators (e.g., about 0.375 inch) to the height of the turbulators (e.g., about 0.25 inch) is about 15, but may between about 5 and 20. FIG. 5 illustrates a partial end view taken along line 5—5 of a conventional stator core lamination assembly shown in FIG. 3. Additional embodiments of turbulators are described and shown in U.S. Pat. No. 5,869,912.

Figure 6:
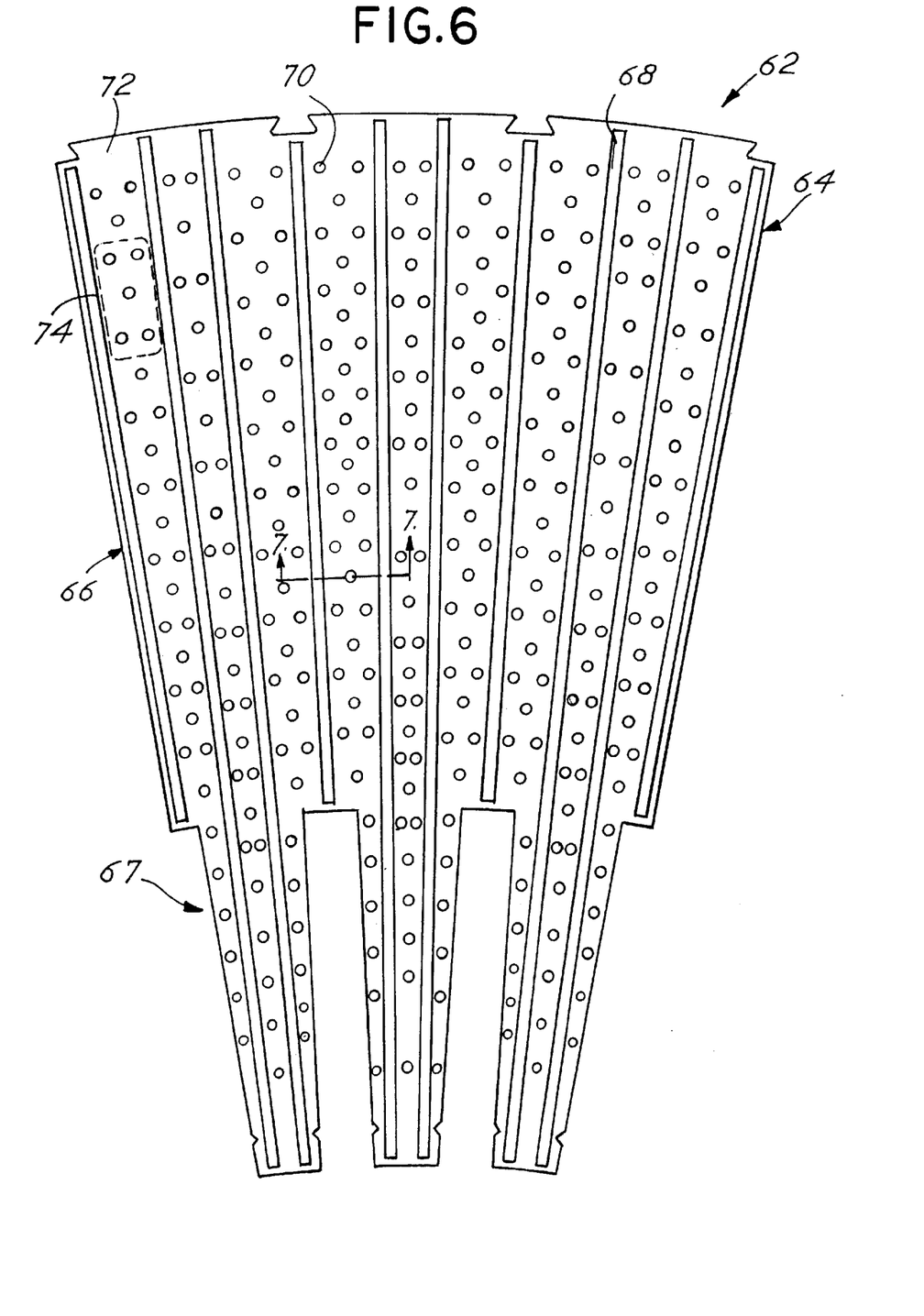
FIG. 6 illustrates a partial side elevation view of a stator core lamination assembly in accordance with one embodiment of the present invention.
Figure 7:
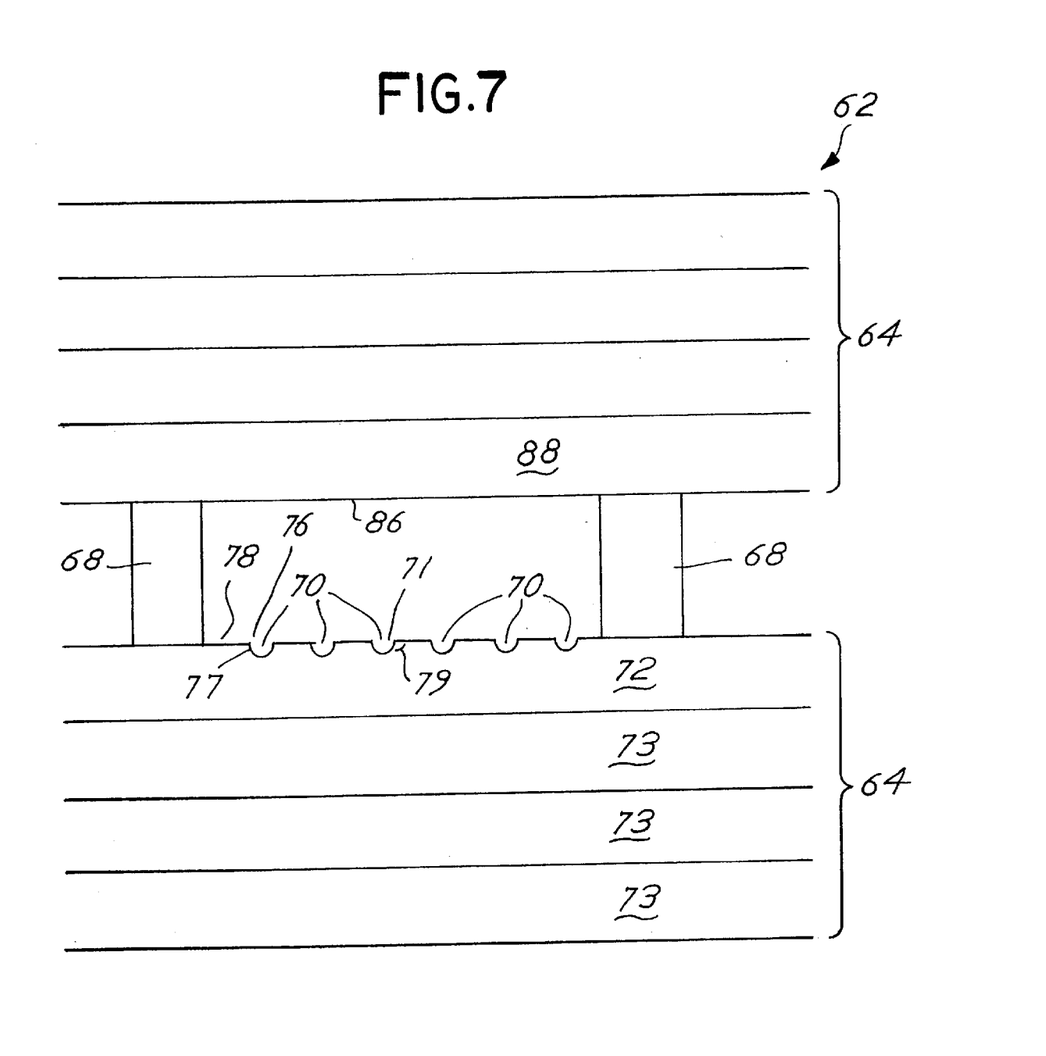
FIG. 7 illustrates a partial end view taken along line 7—7 of a stator core lamination assembly shown in FIG. 6.

FIGS. 6 and 7 illustrate a stator core lamination assembly 62 in accordance with one embodiment of the present invention. The stator core package 64 is generally similar to that shown in FIGS. 1 and 3, in that radially oriented coolant passages are formed by radially extending spacer blocks 68 and two adjacent laminations of adjacent lamination packages. FIG. 6 also illustrates the location and orientation of a plurality of concavities 70 within each of the radially extending cooling ducts. As shown, the concavities 70 can be in the yoke region 66 or the tooth region 67.

Figure 8:
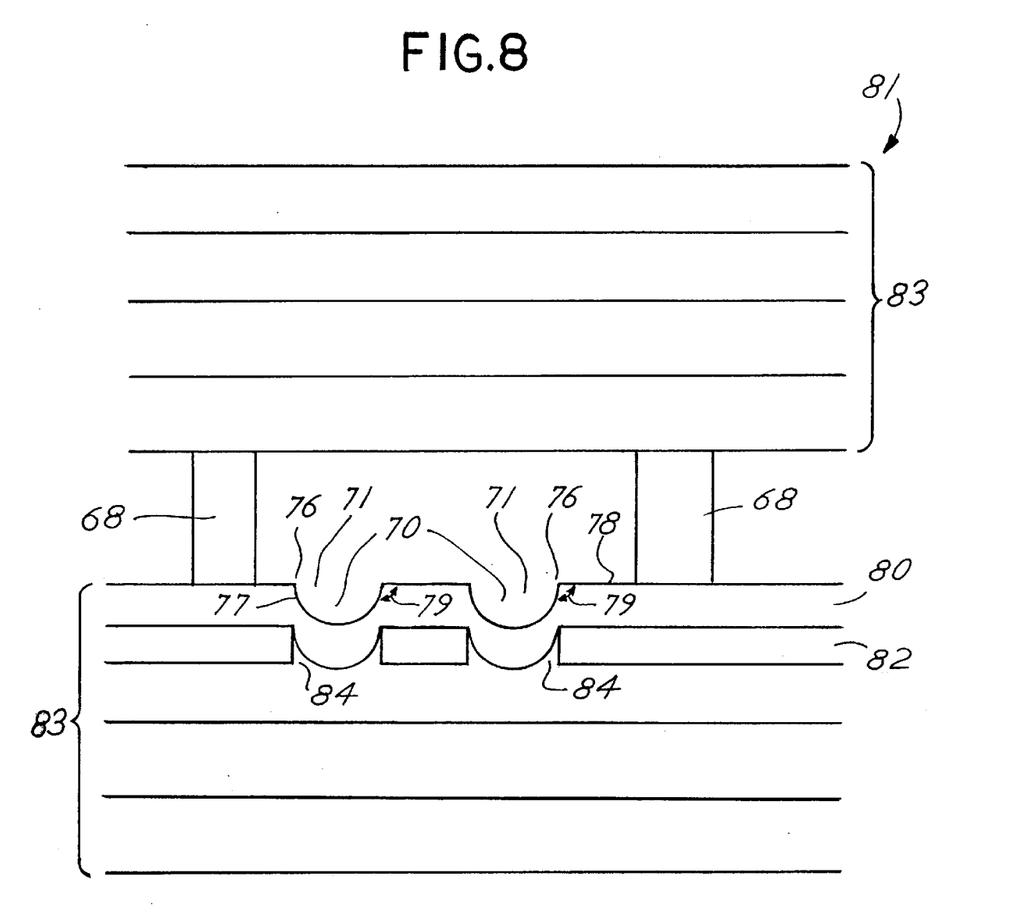
FIG. 8 illustrates a partial end view of a stator core lamination assembly in accordance with another embodiment of the present invention.
Figure 13:
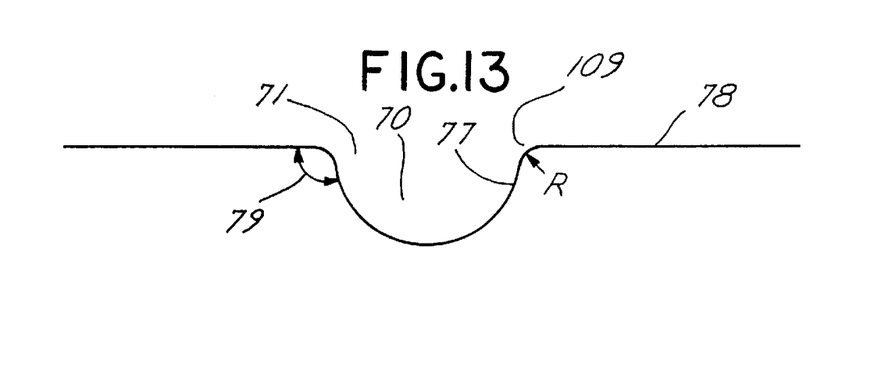
FIG. 13 illustrates a partial end view of a concavity of a stator core lamination assembly in accordance with another embodiment of the present invention.

More specifically, in this embodiment the spacer sheet 72 is formed with an array 74 of surface concavities 70. Spacer sheet 72 has a thickness of about the same as the other lamination sheets 73, but can be greater if desired. The concavity array 74 has the following properties:

1. Each concavity or dimple 70 in the outermost surface 78 of spacer sheet 72 has an opening 71 having a surface diameter of 2 to 5 millimeters (mm).
2. Each concavity 70 is a hemispherical shape, though not necessarily a full hemisphere. The present invention includes concavities comprising hemispherical sectors or chords. For example, the concavity depth-to-surface diameter ratio can be from about 0.1 to 0.50. When the concavity depth-to-surface diameter ratio is 0.50, the concavity is a full hemisphere.
3. Each concavity 70 has a maximum depth of 0.3 to 1.5 mm.
4. The center-to-center spacing of the concavities 70 in the array 74 is from about 1.1 D to 2 D, where D is the surface diameter of each concavity 70 at opening 71.
5. The pattern of array 74 can be one of uniformly spaced concavities 70 as shown, with a staggered alignment between rows. However, it is conceivable that the concavity dimensions and spacing. will change with the location in the stator duct, since the duct width changes with location.
6. Each concavity 70 has a wall 77 that forms an angle 79 with surface 78. Further, each concavity 70 can have a sharp edge 76 at the surface 78, that is when angle 79 is about 90 degrees. However, curved edges can be obtained in the manufacturing process if desired, for example, for painting to prevent electrical shorts. In the instance of curved edges, the angle 79 is greater than about 90 degrees. FIG. 13 shows a curved edge 109 where angle 79 is greater than about 90 degrees. In other words, as shown in FIG. 13, "R" is the radius of the largest circle which may be circumscribed within the curved edge 109 of the concavity 70 as seen in cross-sectional view. "R" may be from about 0 to 0.10 inches (2.54 mm). A value of R=0 would indicate a sharp edge 76 as shown in FIG. 8.
7. The concavities 70 may take on altered geometries (non hemispherical) depending on the fabrication method.

Those of skill in the art will recognize that the exact or optimal concavity design and alignment for a given application will depend upon the specific machine design conditions. Feasible ranges of parameters have been provided to illustrate the likely designs to be used for certain conditions.

Figure 9:
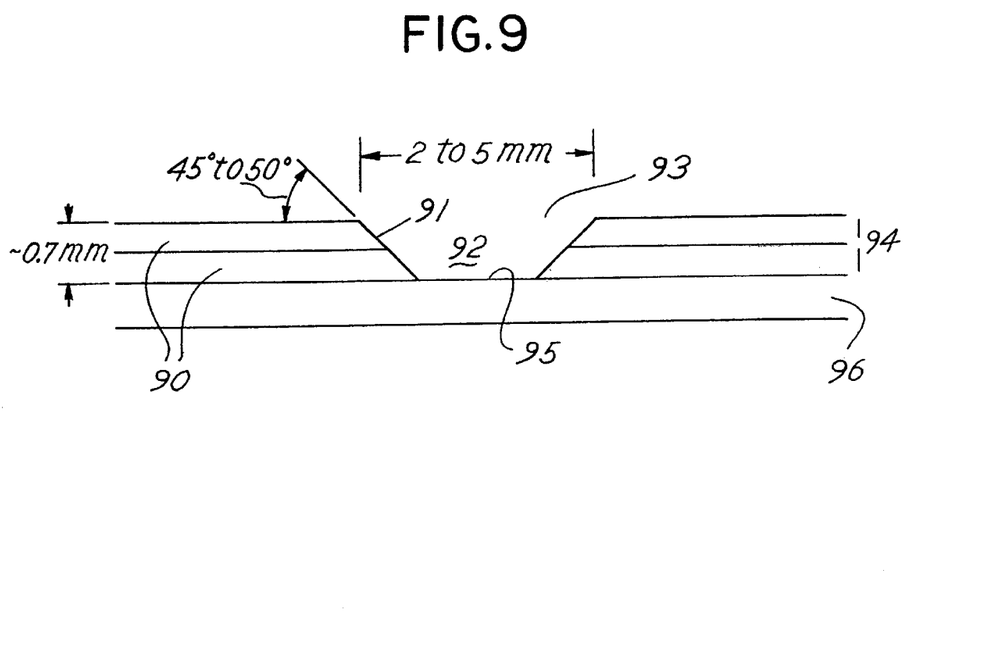
FIG. 9 illustrates a partial end view of a stator core lamination assembly in accordance with another embodiment of the present invention.
Figure 10:
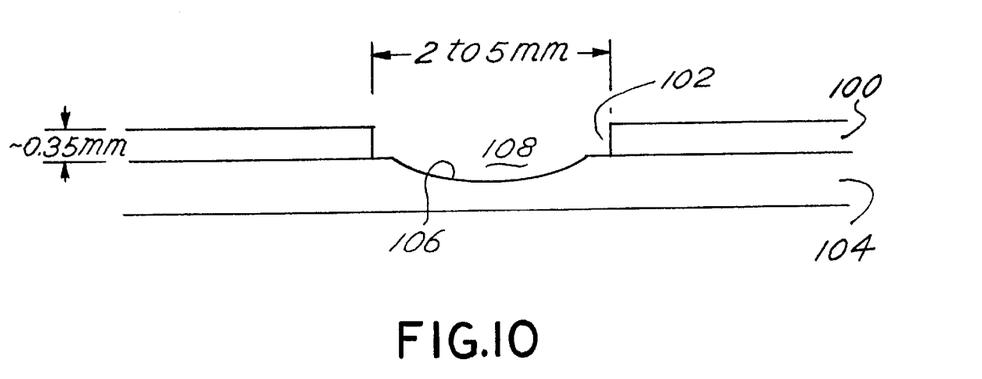
FIG. 10 illustrates a partial end view of a stator core lamination assembly in accordance with another embodiment of the present invention.
Figure 11:
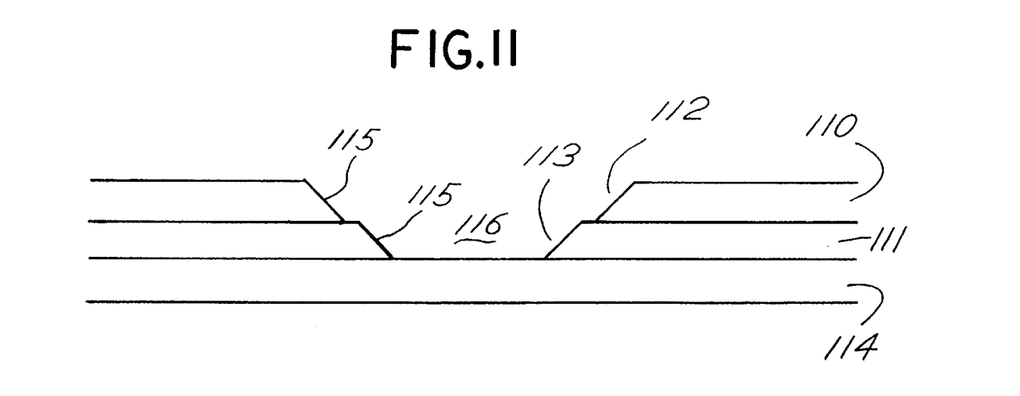
FIG. 11 illustrates a partial end view of a stator core lamination assembly in accordance with another embodiment of the present invention.
Figure 12:
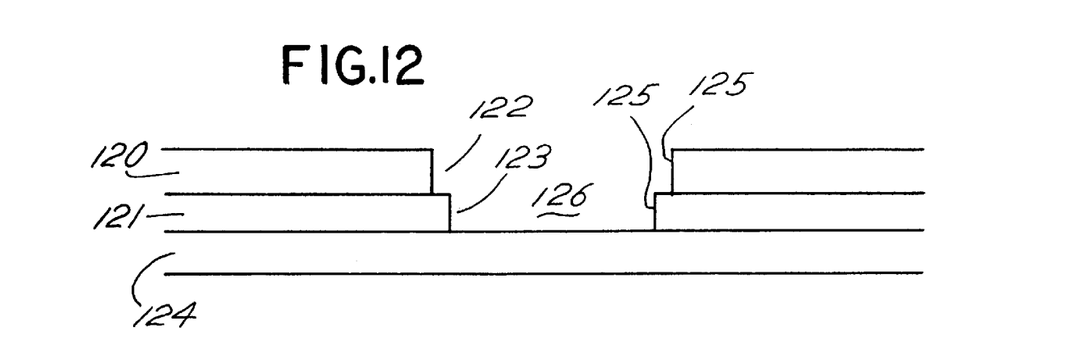
FIG. 12 illustrates a partial end view of a stator core lamination assembly in accordance with another embodiment of the present invention.

Those of skill in the art will recognize that concavities 70 in accordance with the present invention can be formed in a number of ways. Examples include, but are not limited to the following:

1. Preformed pressed sheets;
2. Deformation by stamping of a pattern on a single sheet;
3. Deformation or indentation by regional tooling or hand stamping;
4. Deformation of one sheet by tooling or stamping to form concavities, with that sheet then stacked on top of a second sheet having through holes cut or punched therein to receive the deformed material of the upper sheet (this construction is shown in FIG. 8).
5. Punching of conical holes into the sheets (this construction is shown in FIG. 9);
6. Punching of circular holes, followed by light stamping to round the cavity bottom (this construction is shown in FIG. 10); and
7. Stacking of punched layers with various size holes (various constructions thereof are shown in FIGS. 11 and 12).

As shown in FIG. 8, a core lamination assembly 81 has a stator core package 83, which has a first sheet 80 is formed to have concavities 70, and a second sheet 82 has holes 84 formed therein to receive the concavities 70 of the first sheet 80. Like FIG. 7, FIG. 8 shows a sharp edge 76, where angle 79 is about 90 degrees.

As shown in FIG. 9, two or more laminate sheets 90 can be punched individually or together and then stacked onto each other. Punching the laminate sheets 90 as a stack permits precision and tight tolerances for resulting concavities 92. The stack 94 of two or more laminate sheets 90 can be laid onto a flat bottom laminate sheet 96. FIG. 9 illustrates a stack 94 having a thickness of about 0.7 mm, an opening 93 of concavity 92 of about 2 to 5 mm, and an angle of about 45–50 degrees between slant 91 of each laminate sheet 90 and the horizontal surface of the next sheet in stack 94.

As shown in FIG. 10, one laminate sheet 100 is punched with a round hole 102, and stacked over a flat laminate sheet 104, which is then lightly stamped to round the bottom 106 of concavity 108. FIG. 10 illustrates a laminate sheet 100 having a thickness of about 0.35 mm, and an opening 101 of concavity 108 of about 2 to 5 mm.

As shown in FIG. 11, multiple laminate sheets 110 and 111, each having different conical sized holes 112 and 113, respectively, can be stacked onto a flat laminate sheet 114. The end result is a concavity 116 having a pair of slanted walls 115.

As shown in FIG. 12, multiple laminate sheets 120 and 121, each having different sized holes 122 and 123, respectively, can be stacked onto a flat laminate sheet 124. The end result is a concavity 126 having a pair of vertical walls 125.

Each concavity can be a hemispherical shape (for example as shown in FIGS. 6–8), or a have a geometry approaching a hemispherical shape (for example as shown in FIGS. 9–12). A concavity having a geometry approaching a hemispherical shape comprises an opening 93 having a cross-sectional area for the cavity that is equal to or greater than the cross-sectional area of the bottom 95 of the cavity, and where at least one cross-sectional area of the concavity is circular or substantially circular in shape.

It is noted that in each of the described embodiments of the present invention, the concavities are shown to extend from one side only of the respective cooling ducts. The concavities could extend, however, from both sides of the ducts, in either aligned or staggered relationship in the radial direction. For example, further cooling enhancement may be obtained in the embodiment shown in FIGS. 6 and 7 by the placement of concavities 70 on the surface 86 of adjacent spacer sheet 88 opposite the spacer sheet surface 78 having concavities 70, so that both surfaces 86 and 78 of the flow duct have concavities 70.

Testing of the cooling ducts having concavities 70 similar to the arrangement illustrated in FIGS. 6 and 7, demonstrate that heat transfer performance at the wall having concavities is enhanced by about 40–50% as that found in a smooth walled coolant passages, and little or no friction penalty.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A stator core assembly comprising adjacent packages of stacked lamination sheets that are separated by a plurality of extending spacer blocks, and each adjacent pair of spacer blocks define in cooperation with the adjacent packages of stacked lamination sheets, a plurality of radial cooling ducts, each duct having at least one lamination surface having a plurality of concavities wherein at least some the concavities form a patterned array, the patterned array comprising more than a single row of concavities in the at least one lamination surface.

2. The stator core assembly of claim 1, wherein each concavity has a surface diameter of about 2 to 5 millimeters.

3. The stator core assembly of claim 1, wherein each concavity is a hemispherical shape.

4. The stator core assembly of claim 1, wherein each concavity has a depth of about 0.3 to 1.5 mm.

5. The stator core assembly of claim 1, wherein center-to-center spacing of the concavities is from about 1.1 D to 2 D, where D is the surface diameter of each concavity.

6. The stator core assembly of claim 1, wherein the patterned array comprises uniformly spaced concavities.

7. The stator core assembly of claim 6, wherein the uniformly spaced concavities comprise a staggered alignment between rows of concavities.

8. The stator core assembly of claim 1, wherein the dimensions of each the concavities and spacing between concavities varies within the location of the concavities in the cooling ducts.

9. The stator core assembly of claim 1, wherein each concavity has a sharp edge at the surface.

10. The stator core assembly of claim 1, wherein each concavity has a curved edge at the surface.

11. The stator core assembly of claim 1, wherein each concavity has a geometry that approaches a hemispherical shape.

12. The stator core assembly of claim 1, wherein at least some concavities have a flat bottom.

13. The stator core assembly of claim 1, wherein at least some concavities have at least a partially round bottom.

14. The stator core assembly of claim 1, wherein at least some concavities have substantially slanted walls.

15. The stator core assembly of claim 12, wherein at least some concavities have substantially slanted walls.

16. The stator core assembly of claim 1, wherein at least some concavities have substantially vertical walls.

17. The stator core assembly of claim 12, wherein at least some concavities have substantially vertical walls.

18. The stator core assembly of claim 13, wherein at least some concavities have substantially vertical walls.

19. The stator core assembly of claim 13, wherein at least some concavities have substantially slanted walls.

20. The stator core assembly of claim 1, wherein at least some concavities have a depth that is less than or equal to the thickness of at least one lamination sheet.

21. The stator core assembly of claim 1, wherein at least some concavities have a depth that is more than the thickness of at least one lamination sheet.

22. The stator core assembly of claim 1, each duct having more than one lamination surface having a plurality of concavities wherein at least some the concavities form a patterned array, the patterned array comprising more than a single row of concavities in the more than one lamination surface.

23. The stator core assembly of claim 1, wherein at least some of the concavities are defined by at least two laminate sheets.

24. The stator core assembly of claim 23, wherein the at least some of the concavities defined by the at least two laminate sheets have substantially slanted walls.

25. The stator core assembly of claim 23, wherein the at least some of the concavities defined by the at least two laminate sheets have substantially vertical walls.

26. The stator core assembly of claim 23, wherein at least some concavities have a flat bottom.

27. The stator core assembly of claim 23, wherein at least some concavities have at least a partially round bottom.

28. The stator core assembly of claim 24, the at least two laminate sheets comprising a first laminate sheet defining a first set of conical holes, and a second laminate sheet defining a second set of conical holes, and a third laminate sheet, the first set of conical holes being larger than the second set of conical holes, the first laminate sheet and the second laminate sheet defining the substantially slanted walls of the concavities and the third laminate sheet defining the bottom of the concavities.

29. The stator core assembly of claim 25, the at least two laminate sheets comprising a first laminate sheet defining a first set of holes, and a second laminate sheet defining a second set of holes, and a third laminate sheet, the first set of holes being larger than the second set of holes, the first laminate sheet and the second laminate sheet defining the substantially vertical walls of the concavities and the third laminate sheet defining the bottom of the concavities.

30. A method of forming a stator core assembly comprising the steps of
 (a) forming adjacent packages of stacked lamination sheets that are separated by a plurality of extending spacer blocks, and each adjacent pair of spacer blocks define in cooperation with adjacent packages of stacked lamination sheets, and a plurality of radial cooling ducts, each duct having at least one lamination surface, and
 (b) forming on the at least one lamination surface a plurality of cavities wherein at least some the concavities form a patterned array, the patterned array comprising more than a single row of concavities in the at least one lamination surface.

31. The method of claim 30, wherein some of the cavities are formed by deforming the at least one lamination surface.

32. The method of claim 31, wherein some of the cavities are formed by punching a hole in the least one lamination surface.

33. The method of claim 32, further comprising the step of stamping a lamination sheet abutting the lamination sheet defining the hole.

* * * * *